Nov. 16, 1943.                I. LAVINE ET AL                    2,334,563
         APPARATUS FOR RECOVERING ANHYDROUS SODIUM
                SULPHATE AND SIMILAR SUBSTANCES
                     Filed May 10, 1941                 2 Sheets-Sheet 1
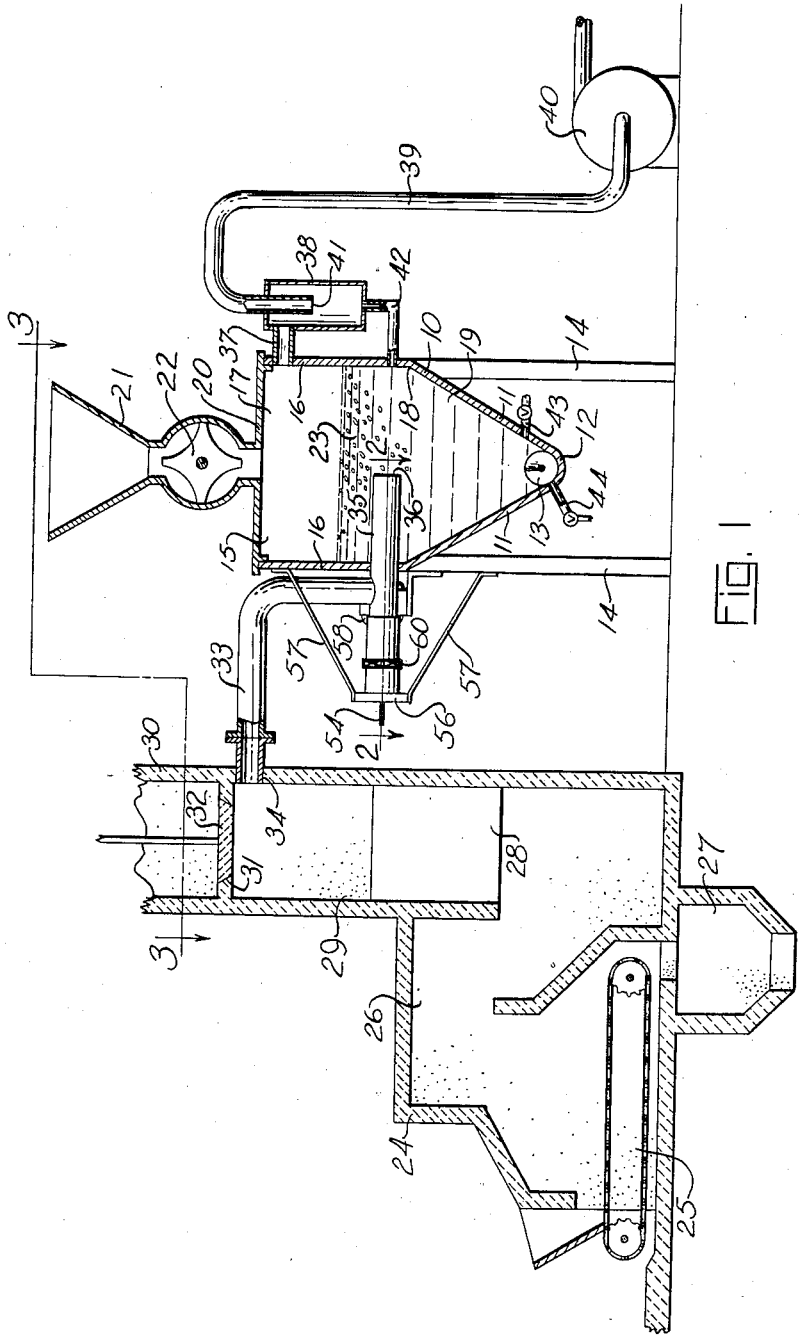
INVENTORS
IRVIN LAVINE
ROBERT F. SCHULTZ
BY
G. H. Braddock
ATTORNEY Nov. 16, 1943.  I. LAVINE ET AL  2,334,563
APPARATUS FOR RECOVERING ANHYDROUS SODIUM
SULPHATE AND SIMILAR SUBSTANCES
Filed May 10, 1941  2 Sheets-Sheet 2
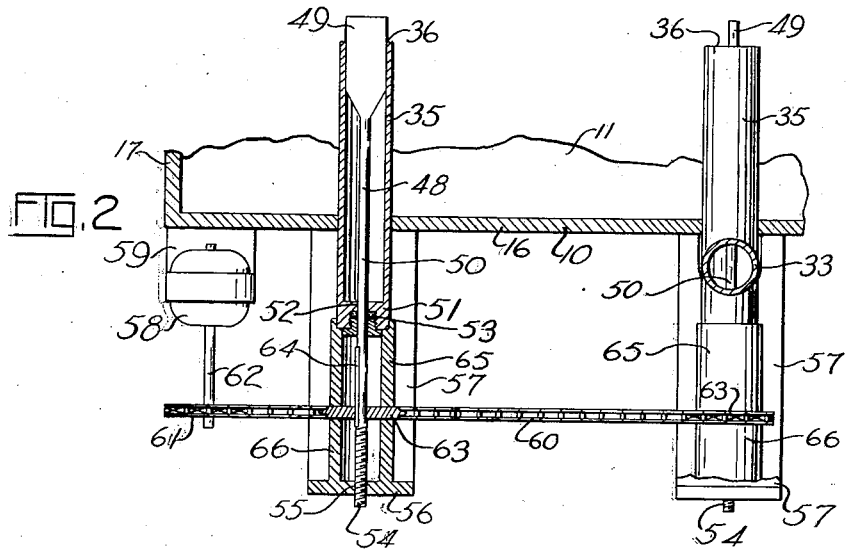
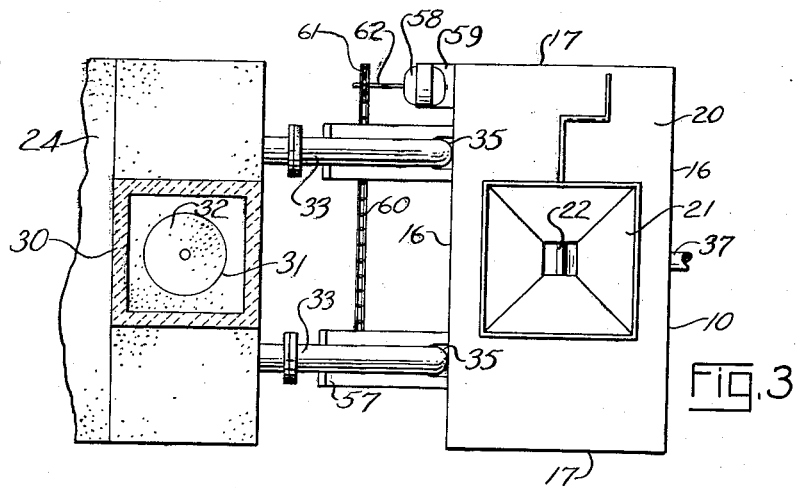
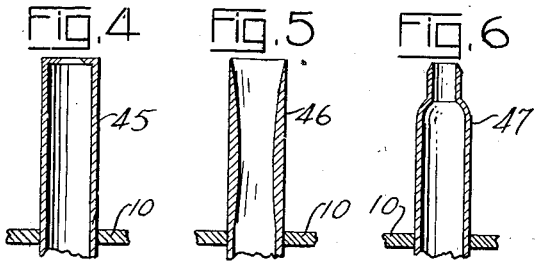
INVENTORS
IRVIN LAVINE
ROBERT F. SCHULTZ
BY
G. H. Braddock
ATTORNEY Patented Nov. 16, 1943

2,334,563

UNITED STATES PATENT OFFICE 2,334,563

APPARATUS FOR RECOVERING ANHYDROUS SODIUM SULPHATE AND SIMILAR SUBSTANCES

Irvin Lavine, Grand Forks, N. Dak., and Robert F. Schultz, East Greenville, Pa., assignors to North Dakota Board of Higher Education, as trustee for the benefit of the School of Mines of the University of North Dakota Application May 10, 1941, Serial No. 392,918

13 Claims. (Cl. 159—16)

This invention relates to an apparatus for drying substances, and has more particular relation to an apparatus for removing water of hydration from more highly hydrated salts thus to recover less hydrated forms of the salts, as, for example, to recover anhydrous sodium sulphate, $Na_2SO_4$, from Glauber salt, $Na_2SO_4.10H_2O$; or to recover sodium carbonate monohydrate, $Na_2CO_3.H_2O$, from sal soda, $Na_2CO_3.10H_2O$; etc. Stated otherwise, the apparatus here presented incorporates features and characteristics of construction adapted to render said apparatus satisfactory to the purpose of accomplishing evaporation of solutions or substances, generally, and especially suitable to the purpose of dehydrating more highly hydrated forms of salts with the end in view of recovery of less hydrated forms of said salts. The embodiment of the apparatus herein selected for illustration of the principles of the invention was designed and has been operated to accomplish dehydration of Glauber salt.

Certain hydrated salts, such as $Na_2SO_4.10H_2O$; $Na_2CO_3.10H_2O$; $MnSO_4.4H_2O$; and $FeSO_4.7H_2O$; have a negative or inverted solubility curve. Other hydrated salts, such as $Cd(NO_3)_2.4H_2O$; $CaCl_2.6H_2O$; $MgSO_4.7H_2O$; and $ZnSO_4.6H_2O$; have a positive or normal solubility curve.

Sodium sulphate decahydrate, or Glauber salt, or mirabilite, occurs naturally in many deposits, or may be crystallized from natural brines by cooling and/or evaporating. Due to the high content of water in the hydrated salt, which is substantially 56 percent., it is much more economical to dehydrate the hydrated salt to the anhydrous form before shipping. At 32.4° C. sodium sulphate decahydrate melts, forming solid sodium sulphate and a saturated solution of the salt. If the temperature of the saturated solution is increased, additional solid sodium sulphate will precipitate from the solution, because the salt is less soluble at higher temperatures. That is, the salt is said to have an inverted solubility curve.

Sodium carbonate decahydrate, also known as sal soda, or washing soda, occurs naturally in many deposits, or may be crystallized from natural brines by cooling and/or evaporating. Although this salt finds a market, the percentage of water in the salt, substantially 63 percent., prevents its shipment for any great distance. At 32.96° C. sodium carbonate decahydrate melts to give solid sodium carbonate monohydrate and a saturated solution of the salt. On further heating of the saturated solution, additional sodium carbonate monohydrate precipitates from the solution, because the salt has an inverted solubility curve. It is not possible to dehydrate the sodium carbonate monohydrate to the anhydrous salt in the presence of the saturated solution because the transition temperature of the monohydrate to the anhydrous salt is above the boiling point of the saturated solution.

Other ordinary or common commercial hydrated salts are manganous sulphate, which usually exists as either the pentahydrate or tetrahydrate, and ferrous sulphate heptahydrate. These salts, like the previously mentioned sodium sulphate decahydrate and sodium carbonate decahydrate, have definite transition temperatures at which a higher hydrated form melts to give a solid monohydrate or anhydrous salt and a saturated solution having an inverted solubility curve, and additional monohydrated or anhydrous salt precipitates from the solution when it is raised to a temperature higher than its transition temperature.

Hydrated salts with a positive or normal solubility curve, such as hereinbefore mentioned, likewise possess transition temperatures at which the salt hydrate melts and is in equilibrium with an anhydrous salt or a hydrated form containing less water than the original hydrate. In some cases the less hydrated form is precipitated from solution when the original hydrate melts. In other cases the salt hydrate melts to form a homogeneous solution. The solubility of these salts with normal solubility curves increases with temperature so that no salt precipitates from solution when the temperature is increased. However, the anhydrous salt or less hydrated salt is precipitated from the solution when the solution becomes saturated by evaporation of water from the solution. Further evaporation of water continues the crystallization of the salt from solution.

A method heretofore in vogue for obtaining the anhydrous or monohydrated form of a salt having an inverted solubility curve from a hydrated form of the salt has been carried out by evaporating a saturated solution of the salt. Evaporators, especially tube evaporators, suitable to the purpose are well known and of many different types. The principle employed for evaporating the solution is the same in all evaporators. Heat is obtained, as from condensing steam, and is transferred from the steam to a metal evaporator tube in which the saturated solution is confined and from this metal evaporator tube to the saturated salt solution. The temperature of the film of saturated solution in contact with the metal tube is made to increase and thus the solubility of the salt is made to decrease, because of the inverted solubility curve of the salt. The salt precipitates or crystallizes out of the saturated solution onto the metal tube as a hard adherent scale. The formation of the film of scale continues to grow by crystallization from the solution, retards heat transfer and decreases the capacity of the evaporator. It is necessary frequently to shut down the evaporator, fill it with fresh water and dissolve out the scale formation from the tubes. Such is a time consuming operation and decreases the output of an evaporator system. Another disadvantage of evaporator systems is that they must employ a solution of the salt being dehydrated as the feed to the evaporators. Hence, when operating to obtain an anhydrous or monohydrated form of a salt from a hydrated form thereof by evaporation of a saturated solution of the salt, it is necessary as a part of the system to dissolve the hydrated crystals to form a solution.

Another method of dehydrating a hydrated salt having an inverted solubility curve which is well known and common, consists in placing the crystal of the hydrated salt into a rotary kiln in such manner that the crystal passes down the kiln countercurrent to the hot burner gases. Under these conditions the crystal melts and deposits solid salt, and the hot burner gases evaporate the water from the saturated solution. The salt deposited adheres very solidly to the walls of the rotary kiln and does not roll freely out of the kiln as the anhydrous salt. Many arrangements to overcome the difficulty just mentioned are in existence, but all of the arrangements include or possess serious disadvantages.

For salt hydrates which have positive or normal solubility curves the disadvantages stated above also apply in the main. For evaporators, the salt hydrate must be dissolved in additional water to form a solution to feed the evaporators, thus increasing the amount of water to be evaporated. The use of the heated rotary kiln is generally unsuitable, for the salts form sticky masses that will not move through the kiln.

Comparatively recently developed and greatly improved methods of dehydrating hydrated salts contemplate the application of heat to a hydrated salt being dehydrated in such manner that the salt crystal upon precipitation out of a solution of the salt is deposited, in the main, clear of the heat transfer medium. That is, the type of apparatus employed in the practice of the just mentioned dehydrating methods is intended to be such that the dehydrated, or partially dehydrated, salt cannot crystallize out of the solution of the hydrated salt being dehydrated in any consequential quantity on the heat transfer medium or metal surface of the apparatus.

An object of the present invention is to provide an apparatus which will incorporate novel and improved features and characteristics of construction designed to render the apparatus capable of accomplishing evaporation of a solution or substance in satisfactory and improved manner.

A further object is to provide an apparatus for evaporating solutions or substances, or for dehydrating salts, wherein will be incorporated various improved features and characteristics of construction novel both as individual entities of said apparatus and in combination with each other.

A further object is to provide an apparatus for dehydrating hydrated salts which will be of type designed to cause heat to be applied to a dyrated salt being dehydrated by the release or application of hot gases within the body of a solution of said hydrated salt in such manner that salt crystal precipitated out of said solution will be deposited, in the main, clear of the heat transfer medium of said apparatus, and also will be an improvement generally over more or less similar apparatuses of this same type heretofore known.

A further object is to provide in the apparatus a novel and improved construction and arrangement for causing hot gases to be released or applied within the body of a solution, such as a saturated solution of a hydrated salt, to be heated and thence removed from the solution and apparatus.

A further object is to provide in the apparatus a novel and improved construction and arrangement for keeping parts of said apparatus, which parts might otherwise become fouled, clear of mineral deposits, such as salt crystal.

And a further object is to provide a dehydrating apparatus of structure as hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a somewhat diagrammatic view of an apparatus in which the features and characteristics of the invention are incorporated;

Fig. 2 is a detail sectional view of said apparatus, taken substantially as on line 2—2 in Fig. 1;

Fig. 3 is a horizontal sectional view, taken as on line 3—3 in Fig. 1; and

Figs. 4, 5 and 6, respectively, are fragmentary longitudinal sectional views disclosing different types of nozzles which can be employed in the apparatus.

When a solution of a hydrated salt to be dehydrated is heated by releasing hot gases within said solution, there is heat transfer from the hot gases directly to the solution with resultant heating and evaporation of the water of said hydrated salt and precipitation of anhydrous, or monohydrated, or less hydrated, salt, and the salt which precipitates has no opportunity to become formed to any real extent as scale upon, or even reach, the major portion of the material of the heat transfer medium or apparatus being employed in the accomplishment of dehydration of said hydrated salt. Instead, the crystallization of the anhydrous or monohydrated or less hydrated form of the salt from the solution thereof being dehydrated is within the interior of the solution of the hydrated salt itself, and precipitation of the anhydrous or monohydrated or less hydrated form of the salt occurs, for the most part, at locations spaced from the heat transfer medium, or walls of the apparatus, employed to the accomplishment of the dehydrating process.

With respect to the drawings and the numerals of reference thereon, an upright evaporator tank 10 of the apparatus may be constructed of any non-corrosive material, such as Monel metal, or asbestos-cement board, commonly known as transite, suitable to the purposes of said evaporator tank. The sides or walls of said tank 10 are desirably smooth to prevent the lodging of crystal on said sides or walls. The size of the evaporator tank will depend upon the capacity of the plant, upon the ease or economy of construction, etc.

The lower portion of said evaporator tank 10 may desirably include sloping side walls or sides 11, 11 which converge near the bottom of the tank into an elongated, relatively narrow U-trough 12. A screw conveyor 13, within the U-trough 12 and operated in any convenient manner, is for collecting and delivering solids precipitated from solution within the tank 10 during operation of the apparatus to a suitable location of said trough whence the precipitated solids can be removed from the apparatus. The evaporator tank 10 may be supported in any suitable and convenient manner, as by a frame 14.

The upper portion 15 of said evaporator tank is as disclosed of rectilinear configuration and includes spaced apart side walls 16, 16 which meet spaced apart end walls 17, 17 of said upper portion at the four corners of the tank. The side walls 16, 16 merge at 18 into the upper margins of the sloping side walls or sides 11, 11, and lower continuations 19, 19 of said end walls 17, 17 constitute end walls for the lower portion of said tank which meet the opposite ends of the sloping side walls or sides 11, 11.

A suitable head or cover for the upper portion 15 of the evaporator tank is denoted 20, and said head or cover is provided with a feed hopper 21 having a feed lock 22. The feed hopper is for receiving material to be treated in the apparatus, and the feed lock, which may be of ordinary or preferred construction and operated in ordinary manner, is for controlling deposit of said material into the tank 10.

Numeral 23 discloses solution to be treated, as, for example, a solution of a hydrated salt, such as Glauber salt, in the tank 10, and the apparatus is equipped to cause hot gases to be released or applied directly within said solution 23 and thence removed from the solution and said apparatus.

In the disclosure as made, the hot gases employed are provided by the combustion of solid fuel, such as lignite, in a furnace 24. It is to be understood, however, that the hot gases utilized in the apparatus could be obtained in some other suitable and convenient manner, as by the combustion of fluid fuels, or by the bringing of atmospheric air up to a desired temperature, as through the instrumentality of a heat exchanger.

The furnace 24 includes a suitable stoker 25, a combustion chamber 26 and an ash pit 27, all of which can be of well known construction. When a fluid fuel is utilized, it will be burned in a furnace assembly especially adapted to efficient combustion of the fluid fuel. Said furnace 24, by reason of the fact that it burns solid fuel, desirably includes a means 28, such as an electrostatic precipitator, or a suitable filter, within a bonnet 29 of the furnace for purifying the combustion gases of fly ash, soot, etc. The combustion chamber 26 is contiguous, or in open communication, with the lower end of the bonnet 29. Together, said combustion chamber 26 and bonnet 29 constitute a compartment for hot gases.

The upper end of said bonnet 29 is adapted to communicate with a stack 30 by way of an opening 31 controlled in suitable and convenient manner by a damper 32, and an upper portion of the bonnet, or compartment for hot gases, is adapted to be in communication with the interior of the evaporator tank 10 through spaced apart outlet pipes 33 leading from said bonnet. As disclosed, each outlet pipe 33 has one of its end portions 34 tightly fitted to the bonnet 29. The damper 32 is adapted to be in closed position, as in Figs. 1 and 3, when hot gases are to be deposited into the solution 23, and in open position when the apparatus is inoperative. The number of outlet pipes 33 may be varied.

For each outlet pipe 33 there is a nozzle 35 for conveying hot gases, and said nozzles 35 open directly into the interior of the evaporator tank at location somewhat below the normal level of solution 23 in said evaporator tank. As disclosed, each outlet pipe 33 leads into a portion of its corresponding nozzle 35 at location intermediate the length of the nozzle and at the outer side of the tank 10. Of course, the unions between the outlet pipes 33 and the nozzles 35 are made fluid-tight. Desirably, said nozzles 35 may enter the upper portion 15 of the evaporator tank at location just above the sloping side walls or sides 11, 11, and, as shown, the mouths or tips 36 of each of the nozzles for conveying hot gases into the tank 10 are situated at about the midwidth of said upper portion of said tank. The nozzles 35 are built into and extend to either side of a side wall 16 of the evaporator tank, and, of course, the unions between said nozzles and said evaporator tank are made fluid-tight.

The hot gases upon entering the interior of the evaporator tank 10, from the bonnet 29, or compartment for hot gases, by way of the outlet pipes 33 and the nozzles 35, may be at a temperature as high as 2000° C., and it is quite difficult to motivate gases at such a high temperature with existing equipment. Consequently, there has been incorporated into the apparatus a construction and arrangement embodying the principle of causing the hot gases to be released or applied within and bubbled through the solution, such as 23, in said evaporator tank and removed from the apparatus by the application of suction or vacuum through the instrumentality of suitable exhausting equipment. That is, the novel and improved apparatus employs suction or vacuum at the outlet side of the evaporator tank to cause the hot gases to be released or applied within the solution, rather than pressure, as heretofore supplied by a fan or blower, at the inlet side of said evaporator tank. Thus the apparatus of the invention obviates mechanical difficulties which attend the motivation of hot gases. In addition to causing the hot gases to be bubbled through the solution, the suction or vacuum producing construction and arrangement also causes the spent gases and vapor produced within the tank 10 to be drawn off from said tank.

More explicitly, a discharge pipe 37 leads from an upper portion of the evaporator tank at elevation above the level of the solution 23 into an upper portion of a liquid-gas separator 38, which may be of common construction, and an exhaust pipe 39 extends from an intermediate portion of said liquid-gas separator to an exhaustor 40, which may be of ordinary or preferred type. The end 41 of said exhaustor pipe 39 which leads from the liquid-gas separator 38 terminates, as disclosed, at about the midheight of said liquid-gas separator, and liquid or solution is adapted to be returned from said separator to the evaporator tank through a small return pipe 42 which extends from the lower end of the separator to a lower part of the upper portion 15 of said evaporator tank. The connections for all of the pipes 37, 39 and 42 of course are fluid-tight.

In order that the apparatus may function to the accomplishment of dehydration of a hydrated salt, a saturated solution, such as 23, of said hydrated salt may be placed in the evaporator tank to a level about as disclosed in Fig. 1. Desirably, the distance between the level of said solution and the nozzles 35 should be that distance of submergence of said nozzles designed to cause hot gases employed to come into thermal equilibrium with the boiling solution. As the hot gases enter the tank 10, at the mouths or tips 36 of the nozzles and by reason of suction or vacuum created by the exhaustor 40, said hot gases are broken up into bubbles, heat is transferred from the bubbles to the solution, and water of said solution evaporates into bubbles. The boiling point of the solution is decreased materially from 100° C. because of the spent gases withdrawn with the water vapor by way of the discharge pipe 37, the separator 38, the exhaust pipe 39 and the exhaustor 40. The temperature of the solution and of the escaping gases and vapor may be determined by means of a thermometer (not shown), and the temperature of said escaping gases and vapor should be not more than one or two degrees higher than the temperature of the solution. If a greater temperature difference exists, the distances between the mouths or tips 36 and the liquid level in the evaporator tank should be increased. When the temperature difference between the withdrawn gases and vapor and the solution of the hydrated salt being dehydrated has minimum value, the system obviously is utilizing the hot gases for heating purposes to maximum extent. The transfer of heat from the hot gases to the solution causes anhydrous or monohydrated or less hydrated salt to precipitate and fall to the bottom of the tank 10, whence the salt in solid form is carried by the screw conveyor 13 to location for removal.

Evidently, heat is transferred by the hot gases directly to the solution and a high degree of efficiency is thus obtained, with the result that the water is rapidly evaporated and the salt is precipitated within the solution. The spent gases and water vapor are readily and effectively drawn off by the exhaustor, and the suction or vacuum produced by said exhaustor causes hot gases to be released or applied within the solution just as readily and effectively as spent gases and water vapor are removed from the evaporator tank. Continuous violent agitation of the solution causes the solid particles of salt to grow to appreciable size before they are ultimately deposited at the bottom of the evaporator tank, and by regulation of the degree of agitation of the solution by regulation of the amount of suction or vacuum produced by the exhaustor 40 and/or varying the depth of submergence of the nozzles 35 the size of the crystals can be subjected to limited control.

Said nozzle 35 could just as well be disposed perpendicularly within the tank 10 as horizontally. In an instance where the nozzles were perpendicular, they desirably would be associated with the head or cover 20, instead of with a side wall 16, as will be understood.

The feed to the evaporator tank may be a saturated solution of a hydrated salt, or the solid salt hydrate, or the hydrated crystal suspended in saturated solution to give a slurry that can be pumped. The maximum thermal efficiency is obtained when the solid hydrated crystal is used as feed, by way of the hopper 21 past the feed lock 22. Upon starting up, the substance in the tank 10 may be a saturated solution alone or saturated solution with water. If water is used, it quickly becomes saturated from the feed. The rate of feed is continuously maintained so that, desirably, the liquid level remains substantially at the predetermined level.

A feed pipe 43 to the lower portion of the evaporator tank 10 may be employed as a feed line for saturated solution, or saturated solution with water, to be used to load said evaporator tank, as, for example, after a shut down of the apparatus, and a draw-off pipe 44, at a low level of the evaporator tank, is for removing liquor or solution from said evaporator tank when this is intentional. The feed pipe 43 and the draw-off pipe 44 are controlled by manually actuable valves.

Figs. 4, 5 and 6 disclose nozzles, denoted 45, 46 and 47, respectively, of several different types which can be employed in the apparatus, in lieu of nozzles of construction as indicated at 35. Nozzles of still other configurations could be satisfactorily utilized. The nozzle 35 is merely a length of pipe. The nozzle 45 is almost as simply constructed as said nozzle 35. It consists of a length of pipe with beveled orifice. The nozzle 46 is a Venturi throat design adapted to provide for greater velocity of flow of hot gases for assisting in maintaining the nozzle free of scaling. The nozzle 47 consists of a length of pipe with reduced end portion including a beveled delivery end. Each of the nozzles 35, 45, 46 and 47 may be composed of Monel metal, steel, or other material suitable to the purpose of the nozzle.

A difficulty ordinarily encountered in the practice of submerged combustion methods of dehydrating hydrated salts is the formation of salt crystal upon the entities, equivalent to the nozzles 35, of the apparatus which deliver hot gases into the bodies of the solutions of the hydrated salts. The present apparatus overcomes the difficulty mentioned by the inclusion of a construction and arrangement for keeping said nozzles 35 clear of salt crystal. More explicitly, scrapers 48, one for each nozzle 35, are provided to prevent undue accumulation of scale upon said nozzles, and especially to keep scale removed from the tips of the nozzles. The scrapers can be of Monel metal, steel, or other suitable material.

In the disclosure as made, each scraper 48 is composed of a single piece of metal or material constituted as a flat blade 49 and a shaft 50. The scrapers are situated within the nozzles 35 with their blades disposed at the mouth or tip ends of said nozzles, and each scraper blade desirably has width about equal to, or a trifle less than, the internal diameter of its corresponding nozzle. The thickness of each blade, with respect to its width, may be about as disclosed in the drawings. Evidently, scrapers of the nature of the scrapers 48 could be employed in connection with some, and perhaps all, of the nozzles disclosed in Figs. 4, 5 and 6.

The outer end 51, opposite the mouth or tip 36, of each nozzle 35 is closed save for an opening 52, disposed centrally of said outer end, in which the shaft 50 of the corresponding scraper is snugly rotatably and slidably situated. Ordinary packing glands 53, one for each nozzle, are for effectively sealing the openings 52, and the shafts 50 are rotatably and slidably mounted in the packing glands 53, as well as in the outer ends of the nozzles 35.

The end portion of the shaft 50 of each scraper 48 opposite the blade 49 of the scraper extends a distance beyond the closed outer end 51 of the corresponding nozzle 35 and includes an external thread 54, desirably of considerable length, adapted to be received in an internal thread 55 of a fitting 56, there being a fitting 56 for and corresponding to each scraper 48. The fittings 56 are made rigid with the evaporator tank 10 through the instrumentality of bracket members 57.

A common drive means for all, two as disclosed, of the shafts 50 includes a reversible electric motor 58 stably supported upon a shelf 59 rigidly mounted upon the evaporator tank. A sprocket chain 60 rides a sprocket 61 fixed upon the motor shaft 62, and also rides each of sprockets 63 individually situated upon the scraper shafts 50. Each sprocket 63 is splined, as at 64, to a portion of its corresponding scraper shaft 50 at location between the outer end 51 of the corresponding nozzle 35 and the external thread 54 upon said scraper shaft.

All of the sprockets 61 and 63 lie in a single vertical plane disposed transversely of the motor shaft 62 and the scraper shafts 50, and, also, said sprockets 61 and 63 are disposed in the same horizontal plane. Devices for retaining each sprocket 63 at fixed distance from the outer end of the corresponding nozzle 35 and the adjacent fitting 56 consist of a sleeve 65 at the inner side of the sprocket rigid with said corresponding nozzle and a sleeve 66 at the outer side of the sprocket rigid with said adjacent fitting. Ends of the sleeves 65 and 66 are engaged with opposed surfaces of the sprockets 63 in such manner as to permit ready rotation of these sprockets while precluding their sidewise movement in either direction relatively to the sprocket 61.

Upon rotation of the motor shaft 62 in one direction the scrapers 48 evidently will be rotated in direction to correspond and moved inwardly by reason of turning movement of the external threads 54 within the internal threads 55, and upon rotation of said motor shaft in opposite direction said scrapers will be rotated in direction to correspond; that is, in opposite direction; and moved outwardly by reason of turning movement of said external threads in said internal threads. Clearly, the splines 64 will permit longitudinal reciprocatory movement of the scraper shafts 50 relatively to the sprockets 63 while causing said scraper shafts to rotate with said sprockets 63 when these are rotated. The construction and arrangement desirably will be such that the scraper blades 49 will wipe a considerable distance along the lengths of the nozzles 35, particularly at the locations of the mouths or tips 36 of said nozzles, and the wiping movement evidently will be accomplished with an oscillatory as well as a reciprocatory motion. Obviously, the wiping action of the scrapers will keep the nozzles, and their mouths or tips, substantially clear of salt crystal.

The extent of reciprocatory movement of the scraper shafts 50 of course will be controlled by the extent of rotation of the motor shaft 62 in each direction, and at the termination of each longitudinal movement of said scraper shafts, the direction of rotation of said motor shaft will be reversed. While the reciprocatory and rotational movements in opposite directions of the scraper shafts, accomplished in the manner as set forth, could be performed unceasingly, it may be desirable, at least in some instances, to cause the electric motor 62 to be de-energized at intervals while the apparatus is functioning, thus to permit or cause said scraper shafts to remain stationary.

What is claimed is:

1. In an apparatus for dehydrating a hydrated salt, a tank adapted to receive said hydrated salt and to contain a solution thereof, an inlet pipe connection adapted to convey hot gases to a portion of the interior of said tank at location below the surface of said solution, a scraper member within said inlet pipe connection, means for causing said scraper member to be reciprocated longitudinally of said inlet pipe connection and rotated alternately in opposite directions, actuating mechanism for said means, and an outlet for conveying spent gases and water vapor from a portion of said tank at location above the surface of said solution.

2. In an apparatus for dehydrating a hydrated salt, a tank adapted to receive said hydrated salt and to contain a solution thereof, an inlet pipe connection adapted to convey hot gases to a portion of the interior of said tank at location below the surface of said solution, a scraper member for wiping the interior of said inlet pipe connection, means for causing said scraper member to be reciprocated, means for causing the scraper member to be rotated alternately in opposite directions, actuating mechanism for each of said means and an outlet for conveying spent gases and water vapor from a portion of said tank at location above the surface of said solution.

3. In an apparatus for dehydrating a hydrated salt, a tank adapted to receive said hydrated salt and to contain a solution thereof, spaced apart tubular members adapted to convey hot gases to a portion of the interior of said tank at location below the surface of the solution, scraper members including a scraper member for wiping each of said tubular members, means for causing said scraper members to be reciprocated, means for causing said scraper members to be rotated alternately in opposite directions, a common drive means for actuating said scraper reciprocating means and said scraper rotating means, and an outlet for conveying spent gases and water vapor from a portion of said tank at location above the surface of said solution.

4. In an apparatus of the character described, a tank adapted to contain a solution, as of a hydrated salt, spaced apart tubular members adapted to convey hot gases to a portion of the interior of said tank at location below the surface of said solution, scraper members for wiping the tubular members including a scraper member within each of the tubular members, a common drive means for causing said scraper members to be reciprocated and rotated alternately in opposite directions, and an outlet for conveying spent gases and water vapor from a portion of said tank at location above and open to the surface of said solution.

5. In an apparatus of the character described, a tank adapted to contain a substance in a liquid state, spaced apart tubular members adapted to convey hot gases directly into said substance, scraper members including a scraper member for wiping each of said tubular members, and a common drive means for reciprocating and rotating said scraper members.

6. In an apparatus for heating a substance in a liquid state by direct contact with hot gases, a tank adapted to contain a quantity of said substance up to a predetermined level, means above said tank for conveying substance into an upper portion of the tank by gravity, means for controlling deposit of said substance into said tank and for sealing said conveying means closed, an inlet pipe connection adapted to convey hot gases to a portion of the interior of said tank at location below the surface of said quantity of substance, an outlet pipe connection for conveying spent gases and vapor from a portion of the interior of said tank at location above and open to the surface of said quantity of substance, and an exhaustor for withdrawing spent gases and vapor from said outlet pipe connection and for causing hot gases from said inlet pipe connection to be applied directly within the body of said quantity of substance.

7. In an apparatus for heating a substance in a liquid state by direct contact with hot gases, a tank adapted to contain a quantity of said substance up to a predetermined level, a cover for said tank, a feed hopper above said cover for conveying substance into an upper portion of said tank by gravity, a feed lock for controlling deposit of said substance into said tank and for sealing an entrance from said feed hopper to the tank closed, an inlet pipe connection for conveying hot gases to a portion of the interior of said tank at location below the surface of said quantity of substance, an outlet pipe connection for conveying spent gases and vapor from a portion of the interior of said tank at location above and open to the surface of said quantity of substance, and an exhaustor for withdrawing spent gases and vapor from said outlet pipe connection and for causing hot gases from said inlet pipe connection to be applied directly within the body of said quantity of substance.

8. In an apparatus for heating a substance in a liquid state by direct contact with hot gases, a tank adapted to contain a quantity of said substance up to a predetermined level, means above said tank for conveying substance into an upper portion of the tank by gravity, means for controlling deposit of said substance into said tank and for sealing said conveying means closed, an inlet pipe connection adapted to convey hot gases to a portion of the interior of said tank at location below the surface of said quantity of substance, an outlet pipe connection for conveying spent gases and vapor from a portion of the interior of said tank at location above and open to the surface of said quantity of substance, a liquid-gas separator in said outlet pipe connection, and an exhaustor for withdrawing spent gases and vapor from said outlet pipe connection and for causing hot gases from said inlet pipe connection to be applied directly within the body of said quantity of substance.

9. In an apparatus for heating a substance in a liquid state by direct contact with hot gases, a tank adapted to contain a quantity of said substance up to a predetermined level, means above said tank for conveying substance into an upper portion of the tank by gravity, means for controlling deposit of said substance into said tank and for sealing said conveying means closed, an inlet pipe connection including a nozzle projecting horizontally into said tank adapted to convey hot gases to a portion of the interior of said tank in spaced relation to its walls and at location below the surface of said quantity of substance, an outlet pipe connection for conveying spent gases and vapor from a portion of the interior of said tank at location above and open to the surface of said quantity of substance, and an exhaustor for withdrawing spent gases and vapor from said outlet pipe connection and for causing hot gases from said inlet pipe connection to be applied directly within the body of said quantity of substance.

10. In an apparatus for heating a substance in a liquid state by direct contact with hot gases, a tank adapted to contain a quantity of said substance up to a predetermined level, means above said tank for conveying substance into an upper portion of the tank by gravity, means for controlling deposit of said substance into said tank and for sealing said conveying means closed, an inlet pipe connection including a nozzle projecting horizontally into said tank adapted to convey hot gases to a portion of the interior of said tank in spaced relation to its walls and at location below the surface of said quantity of substance, an outlet pipe connection for conveying spent gases and vapor from a portion of the interior of said tank at location above and open to the surface of said quantity of substance, a liquid-gas separator in said outlet pipe connection, and an exhaustor for withdrawing spent gases and vapor from said outlet pipe connection and for causing hot gases from said inlet pipe connection to be applied directly within the body of said quantity of substance.

11. In an apparatus for heating a substance in a liquid state by direct contact with hot gases, a tank adapted to contain a quantity of said substance, an inlet pipe connection including a nozzle for conveying hot gases to a portion of the interior of said tank in spaced relation to its walls and at location below the surface of said quantity of substance, a scraper member for wiping the interior of said nozzle, mechanism for actuating said scraper member, and an outlet pipe connection for conveying spent gases and vapor from a portion of the interior of said tank at location above and open to the surface of said quantity of substance.

12. In an apparatus for heating a substance in a liquid state by direct contact with hot gases, a tank adapted to contain a quantity of said substance, an inlet pipe connection including a nozzle for conveying hot gases to a portion of the interior of said tank in spaced relation to its walls and at location below the surface of said quantity of substance, a scraper member for wiping the interior of said nozzle, actuating mechanism for reciprocating and rotating said scraper member, and an outlet pipe connection for conveying spent gases and vapor from a portion of the interior of said tank at location above and open to the surface of said quantity of substance.

13. In an apparatus for heating a substance in a liquid state by direct contact with hot gases, a tank adapted to contain a quantity of said substance, inlet pipe connections each including a nozzle for conveying hot gases to a portion of the interior of said tank in spaced relation to its walls and at location below the surface of said quantity of substance, a scraper member for wiping the interior of each of said nozzles, an actuating mechanism for reciprocating and rotating said scraper members, and an outlet pipe connection for conveying spent gases and vapor from a portion of the interior of said tank at location above and open to the surface of said quantity of substance.

IRVIN LAVINE.
ROBERT F. SCHULTZ.